Feb. 16, 1954   J. A. M. CONTE   2,669,016
ELECTRIC SHAVER WASTE COLLECTING MEANS
Filed Dec. 28, 1949
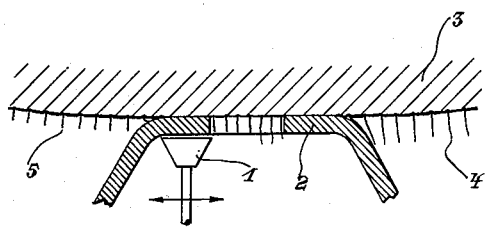
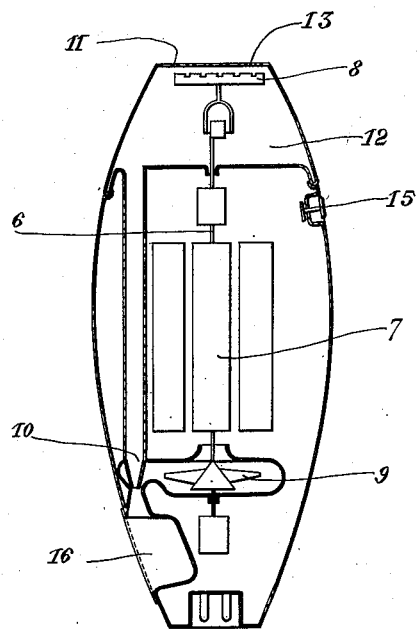
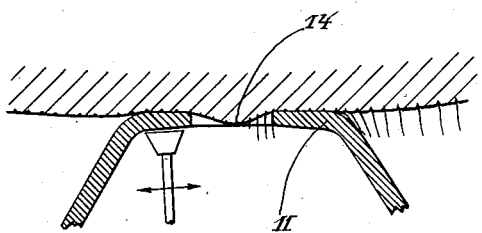

Patented Feb. 16, 1954

2,669,016

UNITED STATES PATENT OFFICE 2,669,016

ELECTRIC SHAVER WASTE COLLECTING MEANS

Juliette Anna Mathilde Conte, Cannes, France

Application December 28, 1949, Serial No. 135,474

2 Claims. (Cl. 30—41.5)

The present invention relates to mechanical shavers.

Known mechanical shavers have a cutter or similar tool located behind a guard and driven with a rotary, reciprocating or helical motion. With such machines, the thickness of the guard is always located between the cutter and the skin so that it is difficult to obtain a close shave.

One of the objects of the present invention is to overcome this drawback by providing a mechanical shaver which is capable of cutting the whiskers at the points where they emerge from the skin.

Another object of the present invention is to provide a means for sucking the skin inwardly through the openings of the guard of the shaver so as to locate the skin closer to the cutter.

A further object of the present invention is to provide a means for adjusting the suction force so that the skin will be sucked inwardly through a distance which is just sufficient to compensate for the thickness of the guard.

With the above objects in view, the present invention mainly consists of an electric shaver which includes a fluidtight casing provided with an axial front opening and a laterally located rear opening. A guard is located in this front opening and a single cutter is located in the casing to the rear of the guard. An inner casing is located to the rear of the cutter and communicates with the atmosphere. An electric motor drives the cutter and is located within the inner casing, a shaft being arranged axially of the shaver and being operatively connected to the motor and the cutter. A fan is driven by the shaft and is located inside the inner casing to the rear of the motor with reference to the cutter, this fan producing a draft of air through the casing over the motor. A bypass channel connects the part of the fluidtight casing located in front of the inner casing with the rear opening, and the fan communicates with the rear end of the channel to produce a second draft of air therethrough toward the rear opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 17 is a fragmentary, partly sectional diagrammatic view illustrating the action of known shaving machines;

Fig. 2 is a diagrammatic longitudinal sectional view of a shaving machine constructed in accordance with the present invention; and Fig. 3 is a fragmentary diagrammatic partly sectional view illustrating the operation of the shaving machine of the invention.

Referring now to the drawings, and in particular to Fig. 1 thereof, it will be seen that the known shaving machine of Fig. 1 includes a cutter 1 which cuts the whiskers 4 which extend from the skin 3. As is evident from Fig. 1, the cutter 1 cannot cut the whiskers 4 down to the skin 3 because of the thickness of the guard 2 through which the whiskers 4 extend into the shaver to be cut by the cutter 1. Thus, with the known construction of Fig. 1 short whiskers 5 will necessarily remain.

Manufacturers of shaving machines have attempted to overcome this drawback by providing exceedingly thin guards 2, but even with such guards it is practically impossible to quickly and easily cut the whiskers 4 at the points where they emerge from the skin 3.

Referring now to the structure of the invention which is shown in Fig. 2, it will be seen that the shaft 6 of the motor 7 is operatively connected to the single cutter 8 for driving the same, and at the rear of motor 7 the shaft 6 carries a small fan 9 provided with a plurality of blades for drawing air through the bypass channel 10, which is similar to a jet pump, so as to reduce the pressure prevailing to the rear of the guard 11 located at the front of the machine beyond the cutter 8.

To assure the desired suction, the head 12 of the machine, which encloses the guard 11, the cutter 8 and its support, is fluid tightly mounted on the machine so as to permit air to enter into the machine only through the openings 13 of the guard 11.

The shape, number and magnitude of these openings 13 is such that the slight suction exerted by the bypass channel 10 under the action of the fan 9 will draw the skin into the openings in the manner diagrammatically illustrated in Fig. 3 so that bulged portions 14 of the skin extend into the openings 13 to exactly compensate for the thickness of the guard 11. The cutter 8 then passes tangentially over the bulged portions 14 of the skin and cuts the whiskers flush with the skin.

Adjustment of the suction force is obtained by modifying the suction exerted through the bypass channel 10, this suction being controlled by the amount of air passing through the fan 9.

This latter adjustment is obtained, for example, through the medium of an air inlet valve 15 or through the medium of a throttling valve located at the outlet side of the fan, the operator modifying the air conveyed by the fan 9 so as to obtain, in accordance with the requirements of his particular skin, the best possible efficiency without being able to exceed the maximum opening provided by the valve 15 or the above-mentioned throttling valve so that it is not possible to suck the skin through the openings 13 to such an extent that the skin will be injured.

The circulation of air inside the machine casing advantageously cools the motor. The whiskers severed by the cutter 8 are sucked through the bypass channel 10 and delivered from the latter into a removable box 16 which is emptied from time to time. The whiskers cannot gain access to the fan blades which are thereby protected against improper operation. The inside of the machine and the channel 10 and box 16 are easily accessible so that they may be easily cleaned.

In contradistinction to known shaving machines which require considerable pressure of the guard against the skin to cut the whiskers, the machine of the invention shaves in a perfectly smooth manner and with a light pressure against the skin.

It will be understood that each of the elements described above, or two or more together, may also find a useful application in other types of shaving machines differing from the types described above.

While the invention has been illustrated and described as embodied in suction operated shaving machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric shaver comprising a fluidtight casing provided with an axial front opening and a laterally shifted rear opening, a guard fitted in said front opening, a single cutter to the rear of said guard, an inner casing to the rear of the cutter communicating with the atmosphere, an electric motor driving said cutter and lying inside said inner casing, a shaft arranged axially of the shaver and operably connecting the motor and the cutter, a fan driven by said shaft and lying inside the inner casing to the rear of the motor with reference to the cutter and producing a draft of air through the casing over the motor, a by-pass channel connecting the part of the fluidtight casing to the front of the inner casing with the rear opening and means wherethrough the fan communicates with the rear end of the channel to induce a second draft of air therethrough towards the rear opening.

2. An electric shaver comprising a fluidtight casing provided with an axial opening and a laterally shifted rear opening, a guard fitted in said front opening, a single cutter to the rear of said guard, an inner casing to the rear of the cutter communicating with the atmosphere, an electric motor driving said cutter and lying inside said inner casing, a shaft arranged axially of the shaver and operably connecting the motor and the cutter, a fan driven by said shaft and lying inside the inner casing to the rear of the motor with reference to the cutter and producing a draft of air through the casing over the motor, a by-pass channel connecting the part of the fluidtight casing to the front of the inner casing with the rear opening and means wherethrough the fan communicates with the rear end of the channel to induce a second draft of air therethrough, a removable box fitted in the rear end of the channel and opening unobstructedly into said channel and communicating with the rear opening in the fluidtight casing, said box being adapted to receive the cut hair and including a sluice for the emptying thereof.

JULIETTE ANNA MATHILDE CONTE.

References Cited in the file of this patent

UNITED STATES PATENTS

| Number | Name | Date |
| --- | --- | --- |
| 1,730,004 | Gregson | Oct. 1, 1929 |
| 2,183,442 | Blackwell | Dec. 12, 1939 |
| 2,371,535 | McGuffin | Mar. 13, 1945 |